US011267460B2

(12) United States Patent
Sugano

(10) Patent No.: US 11,267,460 B2
(45) Date of Patent: Mar. 8, 2022

(54) AUTOMATIC PARKING MANAGEMENT APPARATUS

(71) Applicant: Toyota Jidosha Kabushiki Kaisha, Toyota (JP)

(72) Inventor: Tatsuya Sugano, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 83 days.

(21) Appl. No.: 16/778,376

(22) Filed: Jan. 31, 2020

(65) Prior Publication Data
US 2020/0254999 A1 Aug. 13, 2020

(30) Foreign Application Priority Data
Feb. 8, 2019 (JP) .............................. JP2019-021398

(51) Int. Cl.
B60W 30/06 (2006.01)
B60W 60/00 (2020.01)

(52) U.S. Cl.
CPC .......... B60W 30/06 (2013.01); B60W 60/001 (2020.02)

(58) Field of Classification Search
CPC . B60W 30/06; B60W 60/001; B62D 15/0285; G08G 1/096725; G08G 1/0968; G08G 1/14
See application file for complete search history.

(56) References Cited

U.S. PATENT DOCUMENTS

| 10,338,586 B2 * | 7/2019 | Kurt ................... G01C 21/3407 |
| 10,386,845 B1 * | 8/2019 | Konrardy ............. G05D 1/0285 |
| 2014/0089021 A1 * | 3/2014 | Stefik ....................... G08G 1/14 705/5 |
| 2017/0320466 A1 * | 11/2017 | Nordbruch .......... B60R 25/2018 |
| 2018/0024548 A1 * | 1/2018 | Mielenz ........... G08G 1/096844 701/2 |
| 2018/0046198 A1 | 2/2018 | Nordbruch et al. |
| 2018/0058878 A1 * | 3/2018 | Roth ...................... G08G 1/143 |
| 2019/0180618 A1 * | 6/2019 | Nordbruch ............... G08G 1/14 |

FOREIGN PATENT DOCUMENTS

JP 2018-097536 A 6/2018

* cited by examiner

Primary Examiner — Abby Y Lin
Assistant Examiner — Danielle Marie Jackson
(74) Attorney, Agent, or Firm — Dinsmore & Shohl LLP

(57) ABSTRACT

An automatic parking management apparatus is configured to manage an automatic parking control of automatically parking a vehicle in an empty parking space. The automatic parking management apparatus is provided with: an acquirer configured to obtain a common route, which is a common part of a plurality of routes on which the vehicle, which is about to start the automatic parking control, possibly travels in the automatic parking control; a first transmitter configured to transmit information associated with the common route to the vehicle, before a travel route on which the vehicle travels in the automatic parking control is determined; and a second transmitter configured to transmit information associated with a non-common route, which excludes the common route from the travel route, to the vehicle, after the travel route on which the vehicle travels in the automatic parking control is determined.

4 Claims, 3 Drawing Sheets

AUTOMATIC PARKING MANAGEMENT APPARATUS

CROSS-REFERENCE TO RELATED APPLICATIONS

This application is based upon and claims the benefit of priority of the prior Japanese Patent Application No. 2019-021398, filed on Feb. 8, 2019, the entire contents of which are incorporated herein by reference.

BACKGROUND

1. Technical Field

Embodiments of the present disclosure relate to an automatic parking management apparatus configured to manage automatic parking or automated parking of a vehicle.

2. Description of the Related Art

For this type of apparatus, there is known an apparatus configured to manage automatic parking (or so-called automated valet parking) of a vehicle. For example, Japanese Patent Application Laid Open No. 2018-097536 (Patent Literature 1) discloses an apparatus that is configured to generate an exit travel route in accordance with an exit request and that is configured to transmit the generated exit travel route to a vehicle side.

In the automatic parking of a vehicle, a travel route is generated from a predetermined start position to a target parking space. However, if the travel route is long (i.e., if there is a long distance between the start position to the parking space), travel route information has a large data size. In this case, it increases a time required to transmit the travel route information (or in other words, a download time of the travel route information on the vehicle side), and thus, it takes a time to start the automatic parking, which is technically problematic.

SUMMARY

In view of the aforementioned problem, it is therefore an object of embodiments of the present disclosure to provide an automatic parking management apparatus that can reduce a time required to start an automatic parking control.

An aspect of an automatic parking management apparatus according to the present disclosure is an automatic parking management apparatus configured to manage an automatic parking control of automatically parking a vehicle in an empty parking space, the automatic parking management apparatus provided with: an acquirer configured to obtain a common route, which is a common part of a plurality of routes on which the vehicle, which is about to start the automatic parking control, possibly travels in the automatic parking control; a first transmitter configured to transmit information associated with the common route to the vehicle, before a travel route on which the vehicle travels in the automatic parking control is determined; and a second transmitter configured to transmit information associated with a non-common route, which excludes the common route from the travel route, to the vehicle, after the travel route on which the vehicle travels in the automatic parking control is determined.

DETAILED DESCRIPTION OF THE EMBODIMENT

Hereinafter, an automatic parking management apparatus according to an embodiment of the present disclosure will be explained with reference to the drawings.

(Configuration of Apparatus)

Figure 1:
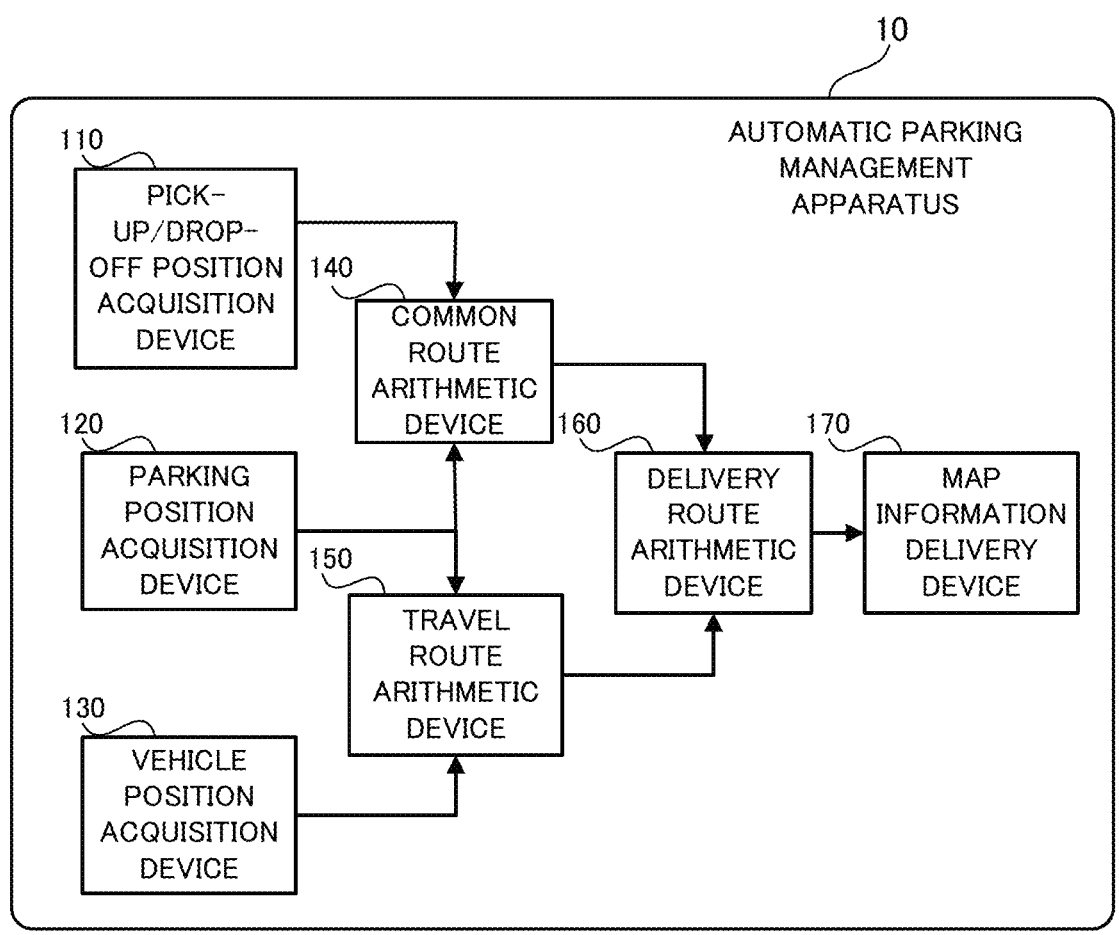
FIG. 1 is a block diagram illustrating a configuration of an automatic parking management apparatus according to an embodiment.

Firstly, a configuration of the automatic parking management apparatus according to the embodiment will be explained with reference to FIG. 1. FIG. 1 is a block diagram illustrating the configuration of the automatic parking management apparatus according to the embodiment.

In FIG. 1, an automatic parking management apparatus 10 according to the embodiment may be provided for a parking lot that allows automatic parking (or so-called automated valet parking), and is configured, for example, as a part of a management or administrative server of the parking lot. The automatic parking management apparatus 10 is configured to manage an automatic parking control of a vehicle in the parking lot, and is provided with a pick-up/drop-off position acquisition device 110, a parking position acquisition device 120, a vehicle position acquisition device 130, a common route arithmetic device 140, a travel route arithmetic device 150, a delivery route acquisition device 160, and a map information delivery device 170, as logical processing blocks or physical processing circuits or processing devices for realizing functions of the automatic parking management apparatus 10.

The pick-up/drop-off position acquisition device 110 is configured to obtain a position of a pick-up/drop-off place in the parking lot, for example, from a not-illustrated database for storing therein map information about the parking lot, or the like. If there are a plurality of pick-up/drop-off places in the parking lot, the pick-up/drop-off position acquisition device 110 is configured to obtain respective positions of the pick-up/drop-off places. The pick-up/drop-off place may be provided as a space for an occupant to get off a vehicle on which the automatic parking control will be performed from now (hereinafter referred to as an "automatic parking vehicle" as occasion demands). The automatic parking control may be performed, with the pick-up/drop-off place as a start position, after the occupant gets off the automatic parking vehicle. Information indicating the position of the pick-up/drop-off place obtained by the pick-up/drop-off position acquisition device 110 may be outputted to the common route arithmetic device 140.

The parking position acquisition device 120 is configured to obtain a parking position in the parking lot (which is specifically a position of a parking space in which the automatic parking vehicle will be parked by the automatic parking control), for example, from the database for storing therein the map information about the parking lot, or the like. Information indicating the parking position obtained by the parking position acquisition device 120 may be outputted to each of the common route arithmetic device 140 and the travel route arithmetic device 150.

The vehicle position acquisition device 130 is configured to obtain a current position of the automatic parking vehicle, for example, by using a global positioning system (GPS) or the like. Information indicating the current position of the automatic parking vehicle obtained by the vehicle position acquisition device 130 may be outputted to the travel route arithmetic device 150.

The common route arithmetic device 140 is configured to arithmetically operate a "common route", which is a common part of a plurality of routes on which the automatic parking vehicle possibly travels in the automatic parking control. For example, the common route arithmetic device 140 may arithmetically operate all the routes from the pick-up/drop-off place, which can be the start position of the automatic parking control, to the parking position of the automatic parking vehicle, and may calculate a section included in all the routes, as the common route. Therefore, the common route arithmetic device 140 is configured to arithmetically operate the common route, for each of a plurality of automatic parking vehicles. Thus, in many cases, the arithmetically operated common route is different for each of the automatic parking vehicles. Information about the common route arithmetically operated by the common route arithmetic device 140 may be outputted to the delivery route acquisition device 160. The common route arithmetic device 140 is an example of the "acquirer" in Supplementary Notes described later.

The travel route arithmetic device 150 is configured to arithmetically operate a "travel route (or a cruise route)", which is a route on which the automatic parking vehicle travels in the automatic parking control (i.e., a route from the pick-up/drop-off place as the start position to the parking position). The travel route arithmetic device 150 may arithmetically operate the travel route, when the automatic parking vehicle stops in the pick-up/drop-off place and the start position of the automatic parking control is determined. Information about the travel route arithmetically operated by the travel route arithmetic device 150 may be outputted to the delivery route arithmetic device 160. The travel route arithmetic device 150 is an example of the "determinator" in Supplementary Notes described later.

The delivery route arithmetic device 160 is configured to arithmetically operate a "delivery route", which is the travel route of the automatic parking control to be delivered to the automatic parking vehicle. Before the travel route is determined by the travel route arithmetic device 150, the delivery route arithmetic device 160 may set the common route arithmetically operated by the common route arithmetic device 140, to the delivery route. After the travel route is determined by the travel route arithmetic device 150, the delivery route arithmetic device 160 may set a "non-common route", which is obtained by subtracting the common route arithmetically operated by the common route arithmetic device 140 from the travel route arithmetically operated by the travel route arithmetic device 150, to the delivery route. Information about the delivery route arithmetically operated by the delivery route arithmetic device 160 may be outputted to the map information delivery device 170.

The map information delivery device 170 is configured to deliver (or transmit) the delivery route arithmetically operated by the delivery route arithmetic device 160 (i.e., the common route or the non-common route) to the automatic parking vehicle, for example, by using wireless communication or the like. The map information delivery device 170 may function as a specific example of the "transmitter" in Supplementary Notes described later, together with the delivery route arithmetic device 160.

(Explanation of Operations)

Figure 2:
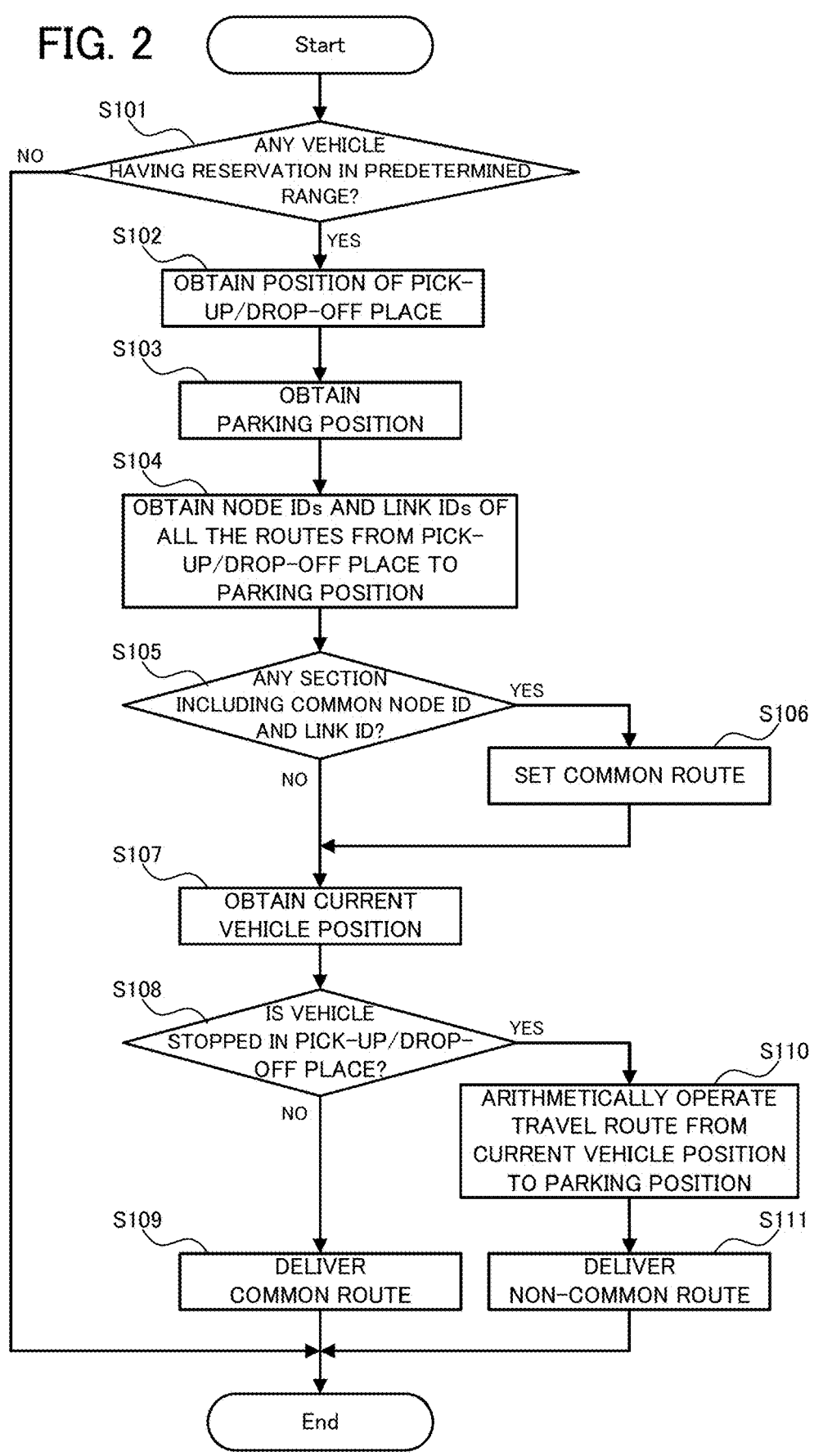
FIG. 2 is a flowchart illustrating a flow of operations of the automatic parking management apparatus according to the embodiment.

Next, a flow of operations (or particularly, an operation of transmitting the delivery route to the automatic parking vehicle) of the automatic parking management apparatus 10 according to the embodiment will be explained with reference to FIG. 2. FIG. 2 is a flowchart illustrating a flow of operations of the automatic parking management apparatus according to the embodiment.

As illustrated in FIG. 2, the automatic parking management apparatus 10 according to the embodiment determines whether or not there is a vehicle having a reservation for the automatic parking, in a predetermined range (step S101). The "predetermined range" herein may be a range for determining whether or not the vehicle is near the pick-up/drop-off place to start the automatic parking control, and may be set as a range in the surroundings of the pick-up/drop-off place (i.e., a range determined on the basis of the pick-up/drop-off place). Considering that the pick-up/drop-off place is possibly located in at least one of the parking lot and the surroundings of the parking lot, the predetermined range may be set, for example, as a range including the parking lot and the surroundings of the parking lot. If it is determined that there is not a vehicle having a reservation for the automatic parking, in the predetermined range (the step S101:NO), it can be determined that there is no vehicle that is about to start the automatic parking control. Thus, the subsequent process is omitted, and a series of steps is ended. In this case, the automatic parking management apparatus 10 may perform the step S101 again after a lapse of a predetermined period.

If it is determined that there is a vehicle having a reservation for the automatic parking, in the predetermined range (the step S101: YES), it can be determined that the vehicle is about to start the automatic parking control soon. In this case, the pick-up/drop-off position acquisition device 110 obtains the position of the pick-up/drop-off place on which the vehicle (i.e., the automatic parking vehicle) possibly stops (step S102). Moreover, the parking position acquisition device 120 obtains the parking position of the automatic parking vehicle (step S103).

Then, the common route arithmetic device 140 obtains node IDs and link IDs of all the routes from the position of the pick-up/drop-off place, which is obtained by the pick-up/drop-off position acquisition device 110, to the parking position, which is obtained by the parking position acquisition device 120 (step S104). In other words, for "nodes (or characteristic points)" and "links (or lines connecting nodes)" included in the map information about the parking lot, the IDs thereof (in other words, identification information) may be obtained. The common route arithmetic device 140 then determines whether or not there is a section including a common node ID and a common link ID, in all the routes from the pick-up/drop-off place to the parking position (step S105). If there is a section including a common node ID and a common link ID (the step S105: YES), the common route arithmetic device 140 sets the section including the common IDs, as the common route (step S106). On the other hand, if there is not a section including a common node ID and a common link ID (the step S105: NO), the common route arithmetic device 140 does not set the common route (i.e., omits the step S106).

Then, the vehicle position acquisition device 130 obtains the current position of the automatic parking vehicle (step S107). Then, the travel route arithmetic device 150 determines whether or not the automatic parking vehicle is stopped in the pick-up/drop-off place (step S108). In other words, the travel route arithmetic device 150 determines whether or not the start position of the automatic parking control is determined.

If it is determined that the automatic parking vehicle is not stopped in the pick-up/drop-off place (the step S108: NO), the delivery route arithmetic device 160 sets the common route to the delivery route, and the map information delivery device 170 delivers the common route to the automatic parking vehicle (step S109). If the step 106 of setting the common route is omitted (i.e., if there is no common route), the step S109 may be omitted.

On the other hand, it is determined that the automatic parking vehicle is stopped in the pick-up/drop-off place (the step S108: YES), the travel route arithmetic device 150 arithmetically operates the route from the current position of the automatic parking vehicle (i.e., the position of the pick-up/drop-off place in which the vehicle is parked) to the parking position, as the travel route of the automatic parking vehicle (step S110). Then, the delivery route arithmetic device 160 sets the non-common route, which is obtained by subtracting the common route from the travel route, to the delivery route, and the map information delivery device 170 delivers the non-common route to the automatic parking vehicle (step S111).

A series of steps described above may be repeatedly performed until all the information about the travel route is transmitted to the automatic parking vehicle. After the end of transmission of all the information about the travel route, the automatic parking control (i.e., movement of the automatic parking vehicle) may be started.

Technical Effect

Figure 3:
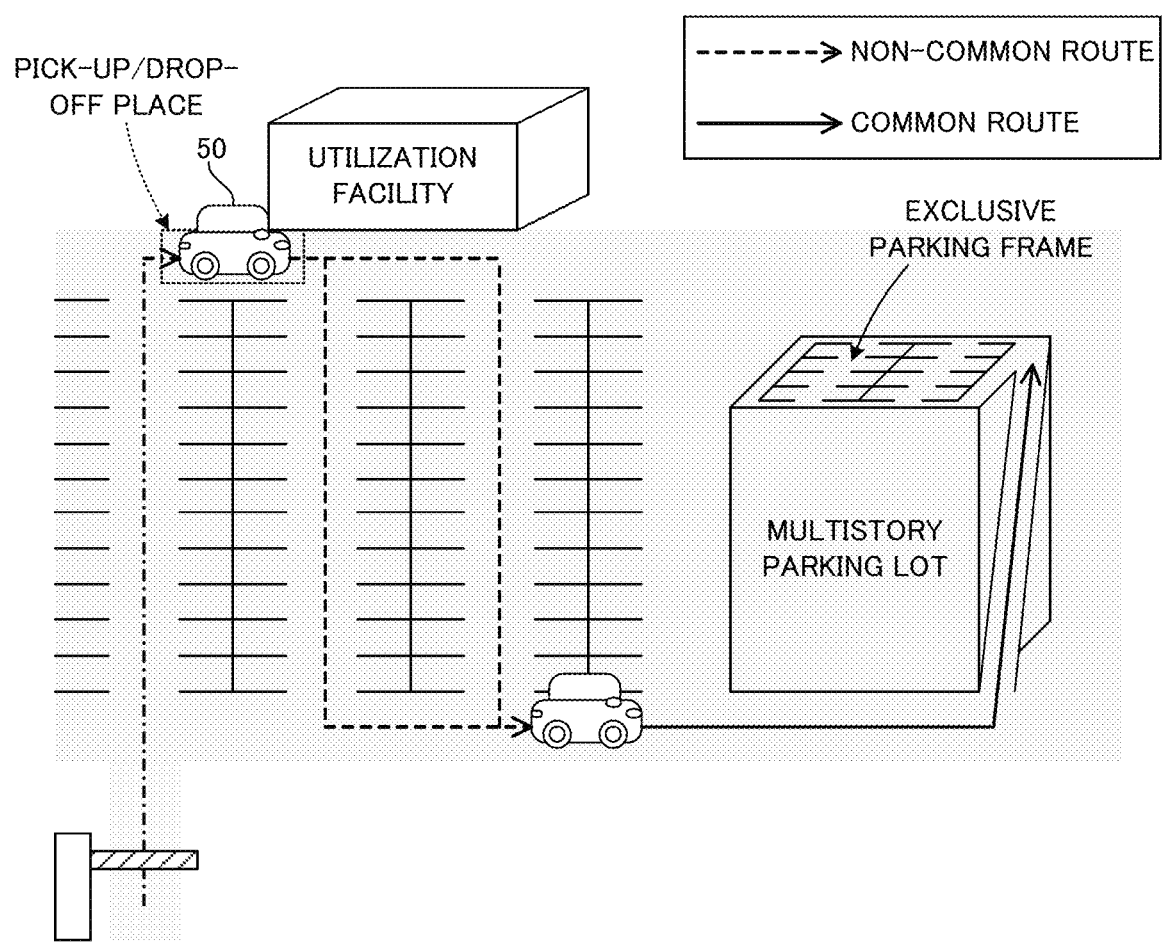
FIG. 3 is a schematic diagram illustrating an example of a common route and non-common routes in an automatic parking control.

Next, a technical effect obtained by the automatic parking management apparatus 10 according to the embodiment will be specifically explained with reference to FIG. 3. FIG. 3 is a schematic diagram illustrating an example of the common route and the non-common routes in the automatic parking control.

As illustrated in FIG. 3, suppose that the automatic parking control is performed from a pick-up/drop-off place located near a utilization facility to an exclusive parking frame located on a roof of a multistory parking lot.

Among routes from the pick-up/drop-off place to the exclusive parking frame, a plurality of routes (i.e., a plurality of non-common routes) can be used to arrive near the multistory parking lot, as illustrated in dashed lines in FIG. 3. Which route to actually use from among the non-common routes may be determined after an automatic parking vehicle 50 is stopped in the pick-up/drop-off place. Thus, a section corresponding to the non-common route is not determined (i.e., is not certain) before the automatic parking vehicle 50 is stopped in the pick-up/drop-off place, and thus, the non-common route cannot be delivered to the automatic parking vehicle 50.

On the other hand, a route to the exclusive parking frame after the vehicle arrives near the multistory parking lot may be a single path, as illustrated in a solid line in FIG. 3, and it is common in all the routes (i.e., it is the common route). Thus, it is certain that the automatic parking vehicle 50 passes through a section corresponding to the common route even before the automatic parking vehicle 50 is stopped in the pick-up/drop-off place. Thus, even before the automatic parking vehicle 50 is stopped in the pick-up/drop-off place and the entire travel route is determined, the common route can be delivered to the automatic parking vehicle 50.

As described above, if the common route is delivered in advance, then, it is possible to reduce an amount of the information that is delivered after the travel route is determined. Specifically, if the common route is delivered before the automatic parking vehicle 50 stops in the pick-up/drop-off place, only the remaining non-common route may be delivered after the automatic parking vehicle 50 stops in the pick-up/drop-off place. As a result, it is possible to reduce a time from when the travel route of the automatic parking control is determined to when the delivery of the travel route ends. It is therefore possible to reduce a time from when the automatic parking vehicle 50 stops in the pick-up/drop-off place to when the automatic parking control is started. For example, it is possible to prevent congestion in the pick-up/drop-off place.

The technical effect described above may show a more significant effect in a longer common route. Thus, if the common route can be updated to a longer one in accordance with the latest situation, then, it is possible to reduce the time from when the travel route is determined to when the automatic parking control is started, more effectively.

For example, if the series of steps illustrated in FIG. 2 is repeatedly performed, the steps from the second time may be performed in a situation in which the current position of the automatic parking vehicle 50 is already obtained in the step S107. Thus, if there are a plurality of pick-up/drop-off places in the parking lot, it is possible to narrow a pick-up/drop-off place in which the automatic parking vehicle 50 possibly stops from now (in other words, the start position of the automatic parking control), on the basis of the current position of the automatic parking vehicle 50. Specifically, a pick-up/drop-off place by which the automatic parking vehicle 50 has already passed, can be removed from a candidate for the pick-up/drop-off place in which the automatic parking vehicle 50 possibly stops. This makes it possible to narrow the routes from the pick-up/drop-off place to the parking position and makes it possible to set the common route as a longer section. More specifically, it is possible to arithmetically operate again a plurality of routes on which the automatic parking vehicle 50 possibly travels (or to remove routes on which the automatic parking vehicle 50 does not possibly travel), and from there, a new common route can be obtained. As a result, there is a possibility that it is possible to further reduce the time from when the travel route is determined to when the automatic parking control is started.

<Supplementary Notes>

Various aspects of embodiments of the present disclosure derived from the embodiment explained above will be explained hereinafter.

(Supplementary Note 1)

An automatic parking management apparatus described in Supplementary Note 1 is an automatic parking management apparatus configured to manage an automatic parking control of automatically parking a vehicle in an empty parking space, the automatic parking management apparatus provided with: an acquirer configured to obtain a common route, which is a common part of a plurality of routes on which the vehicle, which is about to start the automatic parking control, possibly travels in the automatic parking control; a first transmitter configured to transmit information associated with the common route to the vehicle, before a travel route on which the vehicle travels in the automatic parking control is determined; and a second transmitter configured to transmit information associated with a non-common route, which excludes the common route from the travel route, to the vehicle, after the travel route on which the vehicle travels in the automatic parking control is determined.

According to the automatic parking management apparatus described in Supplementary Note 1, the information associated with the common route, which is a common part of a plurality of routes on which the vehicle possibly travels in the automatic parking control, is transmitted to the vehicle, before the travel route of the automatic parking control is determined. The common route may be a route that is known to be traveled by the vehicle even when the entire travel route is not confirmed. Thus, if the information associated with the common route is transmitted before the travel route is determined, the information transmitted after the travel route is determined may have a small data size, in comparison with a situation in which the information associated with the entire travel route is transmitted after the travel route is determined. In other words, it is possible to reduce a time required to transmit the information that is transmitted to the vehicle after the travel route is determined. As a result, it is possible to reduce the time required to start the automatic parking control. The information associated with the non-common route excluding the common route may be transmitted to the vehicle after the travel route of the automatic parking control is determined. Thus, in the end, the information associated with the entire travel route may be transmitted to the vehicle side.

(Supplementary Note 2)

In an automatic parking management apparatus described in Supplementary Note 2, the acquirer is configured to obtain the common route, on condition that the vehicle, which has a reservation for the automatic parking control, passes a predetermined point in surroundings of a pick-up/drop-off place, which is a start position of the automatic parking control.

The information associated with the common route is to be transmitted before the travel route of the automatic parking control is determined, but if the transmission is started too early, it may end up unnecessary information. For example, a situation of a parking space (e.g., full/vacancy information etc.) may change after a lapse of a long time, and thus, an estimated travel route and an estimated parking position may significantly change. It is thus desirable to start to transmit the information associated with the common route a little earlier than the start of the automatic parking control. According to the automatic parking management apparatus described in Supplementary Note 2, the common route is obtained when the vehicle, which has a reservation for the automatic parking control, approaches the pick-up/drop-off place to some extent (i.e., when it is predicted that the automatic parking control is soon to be started), and it is thus possible to transmit the information associated with the common route to the vehicle in appropriate timing.

(Supplementary Note 3)

An automatic parking management apparatus described in Supplementary Note 3, the automatic parking management apparatus is further provided with a determinator configured to determine a travel route on which the vehicle travels in the automatic parking control, on condition that the vehicle stops in a pick-up/drop-off place, which is a start position of the automatic parking control, the first transmitter is configured to transmit the information associated with the common route to the vehicle, before the determinator determines the travel route, and the second transmitter is configured to transmit the information associated with the non common route to the vehicle, after the determinator determines the travel route.

The start position of the automatic parking control is determined when the vehicle stops in the pick-up/drop-off place. For example, even in the case of a parking lot provided with a plurality of pick-up/drop-off places, when the vehicle stops in one pick-up/drop-off place, the one pick-up/drop-off place is determined to be the start position of the automatic parking control. According to the automatic parking management apparatus described in Supplementary Note 3, the information associated with the common route is transmitted to the vehicle before the vehicle stops in the pick-up/drop-off place and the travel route is determined. It is thus possible to reduce an amount of the information that is transmitted after the travel route is determined, and it is also possible to reduce a time to start the automatic parking control.

(Supplementary Note 4)

In an automatic parking management apparatus described in Supplementary Note 4, the acquirer is configured to update a plurality of routes on which the vehicle possibly travels in the automatic parking control, on the basis of a current position of the vehicle, and is configured to obtain the common route of the plurality of routes updated.

The routes on which the vehicle possibly travels in the automatic parking control can be narrowed by using the current position of the vehicle. For example, in the parking lot provided with a plurality of pick-up/drop-off places, there is very little possibility that the automatic parking control is started from a pick-up/drop-off place by which the vehicle 50 has already passed. If the routes on which the vehicle possibly travels are narrowed in this manner, the route obtained as the common route becomes longer. It is thus possible to increase the information that can be transmitted before the automatic parking control is started (or in other words, it is possible to reduce the information that is to be transmitted after the travel route is determined). It is therefore possible to reduce a time to start the automatic parking control.

The present disclosure may be embodied in other specific forms without departing from the spirit or characteristics thereof. The present embodiments and examples are therefore to be considered in all respects as illustrative and not restrictive, the scope of the disclosure being indicated by the appended claims rather than by the foregoing description and all changes which come in the meaning and range of equivalency of the claims are therefore intended to be embraced therein.

What is claimed is:

1. An automatic parking management apparatus configured to manage an automatic parking control of automatically parking a vehicle in an empty parking space, said automatic parking management apparatus comprising:
   a processing circuit configured to:
   obtain a plurality of routes from a position of a pick-up or drop-off place to a parking position;
   determine whether there is a common section in all of the obtained routes; and
   upon determination that there is a common section in all of the obtained routes, set the common section as a common route;
   a first transmitter configured to transmit information associated with the common route to the vehicle, before a travel route on which the vehicle travels in the automatic parking control is determined; and
   a second transmitter configured to transmit information associated with a non-common route, which excludes the common route from the travel route, to the vehicle, after the travel route on which the vehicle travels in the automatic parking control is determined.

2. The automatic parking management apparatus according to claim 1, wherein the processing circuit is configured to obtain the common route, on condition that the vehicle, which has a reservation for the automatic parking control, passes a predetermined point in surroundings of a pick-up/drop-off place, which is a start position of the automatic parking control.

3. The automatic parking management apparatus according to claim 1, wherein
- the processing circuit is further configured to determine a travel route on which the vehicle travels in the automatic parking control, on condition that the vehicle stops in a pick-up/drop-off place, which is a start position of the automatic parking control,
- said first transmitter is configured to transmit the information associated with the common route to the vehicle, before the processing circuit determines the travel route, and
- said second transmitter is configured to transmit the information associated with the non-common route to the vehicle, after the processing circuit determines the travel route.

4. The automatic parking management apparatus according to claim 1, wherein the processing circuit is configured to update a plurality of routes on which the vehicle possibly travels in the automatic parking control, on the basis of a current position of the vehicle, and is configured to obtain the common route of the plurality of routes updated.

* * * * *